J. E. Z. FOWLE.
PENDULUM TOP.
APPLICATION FILED AUG. 24, 1908.

905,684.

Patented Dec. 1, 1908.

WITNESSES

INVENTOR
James E. Z. Fowle
BY
Geo. H. Strong.
ATTORNEY

UNITED STATES PATENT OFFICE.

JAMES E. Z. FOWLE, OF FRUITVALE, CALIFORNIA.

PENDULUM-TOP.

No. 905,684.　　　　Specification of Letters Patent.　　　　Patented Dec. 1, 1908.

Application filed August 24, 1908.　Serial No. 449,988.

*To all whom it may concern:*

Be it known that I, JAMES E. Z. FOWLE, citizen of the United States, residing at Fruitvale, in the county of Alameda and State of California, have invented new and useful Improvements in Pendulum-Tops, of which the following is a specification.

My invention relates to mechanical toys, and pertains especially to a pendulum top.

The object of the invention is to provide a simple attractive toy which besides having its swinging and color features will produce a humming sound like a top.

The invention consists of the parts and the construction and combination of parts as hereinafter more fully described and claimed, having reference to the accompanying drawings, in which—

Figure 1:
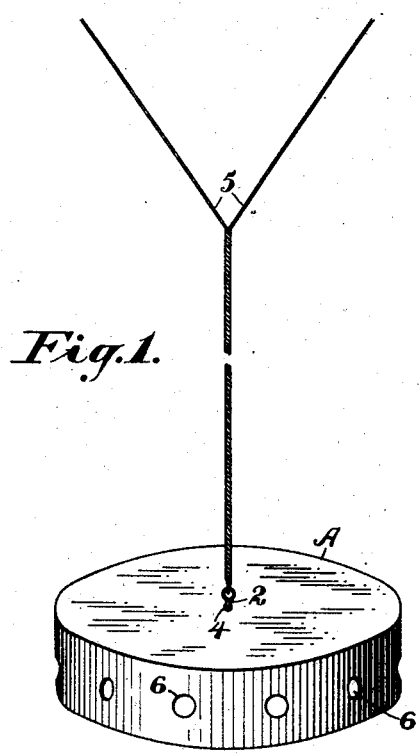
Figure 2:
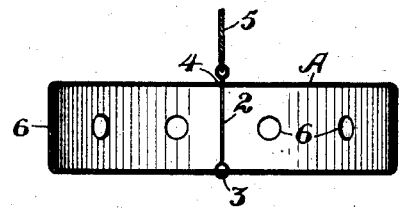

Figure 1 is a perspective view of the invention. Fig. 2 is a cross-section of the top body or drum.

The top consists of a cylindrical body or drum A made of any suitable material, preferably of sheet-metal so as to give it weight. Passing centrally through this drum is a shank 2 preferably made of wire having its lower end bent so as to pass down through the bottom of the top and then turned again up into the top, the center of the loop 3 of the shank beneath the top being approximately coaxial with the body of the shank and with the center of the drum. The shank extends up through the body of the drum through an opening 4 which is just a little larger than the shank, and the end of the shank is bent to form an eye to which the strings 5 are connected. The device is set in motion by twisting these strings and then by pulling on their outer free ends, causing them to untwist, and imparting a rapid rotary motion to the top. When the strings are untwisted they are held together, and the momentum of the top will wind them up again, whereupon the operation is repeated.

By making the body A hollow, and allowing a little room around the shank where the latter passes through the top of the body, as by enlarging the hole 4, a rapid vibration of the drum against the shank takes place, besides imparting a gyratory motion to the drum by reason of its slight eccentricity at the top of the top body. This vibration is so rapid that it produces a sound analogous to the hum of a spinning top. This humming sound may be increased by forming perforations 6 in the drum.

The upper surface of the top may be painted in various colors to produce a color-changing effect.

Having thus described my invention, what I claim and desire to secure by Letters Patent is—

1. A pendulum-top comprising a cylindrical drum suspended by strings, and a shank secured to the strings and passing centrally through the drum and connected to the under side thereof, the upper part of the drum having a loose fit with the shank.

2. In a pendulum-top, a hollow drum, a shank passing centrally therethrough and connected to the top of the drum having a loose fit around the shank whereby the shank will normally be slightly eccentric to the top of the drum, and a spinning cord connected with the shank.

In testimony whereof I have hereunto set my hand in presence of two subscribing witnesses.

JAMES E. Z. FOWLE.

Witnesses:
　JOHN E. BECKER,
　ARTHUR A. BARBER.